(12) United States Patent
Vesio et al.

(10) Patent No.: US 6,620,322 B1
(45) Date of Patent: Sep. 16, 2003

(54) APPARATUS AND METHODS FOR PURIFYING A WASTE INFLUENT MATERIAL

(75) Inventors: Michael G. Vesio, Cincinnati, OH (US); John M. Smith, New Richmond, OH (US)

(73) Assignee: Smith & Vesio LLC, Walton, KY (US)

( * ) Notice: Subject to any disclaimer, the term of this patent is extended or adjusted under 35 U.S.C. 154(b) by 0 days.

(21) Appl. No.: 10/177,679

(22) Filed: Jun. 21, 2002

(51) Int. Cl.[7] .................................................. C02F 3/30
(52) U.S. Cl. ..................... 210/605; 210/623; 210/629; 210/195.3; 210/197; 210/205; 210/259; 210/521
(58) Field of Search ................................. 210/605, 622, 210/623, 629, 630, 170, 194, 195.1, 195.3, 197, 205, 220, 252, 259, 513, 521, 532.1, 260

(56) References Cited

U.S. PATENT DOCUMENTS 1,982,246 A * 11/1934 Fischer .................... 210/609
2,230,386 A * 2/1941 Pecker ..................... 210/521
2,296,437 A 9/1942 Green (List continued on next page.)

FOREIGN PATENT DOCUMENTS

| DE | 3602736 | * 8/1997 |
| EP | 0087129 | * 2/1983 |
| WO | WO9834880 | 8/1998 |

*Primary Examiner*—Fred G. Prince
(74) *Attorney, Agent, or Firm*—Dinsmore & Shohl LLP

(57) ABSTRACT

Apparatus can comprise an anoxic zone, an aeration zone in communication with the anoxic zone, and a sedimentation zone in communication with the aeration and anoxic zones. The sedimentation zone may include a first outlet in a lower portion thereof adapted to recycle material. A device may be provided to control the flow rate of the recycle material. Another device may be positioned relative to a sedimentation zone inlet and adapted to manipulate a material flow profile as material travels into the sedimentation zone. A sedimentation zone may also define an inlet comprising an overlapped area. Methods for purifying a waste inlet material comprise the steps of providing an anoxic zone, an aeration zone and a sedimentation zone. The methods may comprise the step of recycling material from a first outlet in a lower portion of the sedimentation zone.

74 Claims, 8 Drawing Sheets

U.S. PATENT DOCUMENTS

| | | | |
|---|---|---|---|
| 2,348,124 A | | 5/1944 | Green |
| 2,852,140 A | | 9/1958 | MacLaren |
| 3,010,581 A | * | 11/1961 | Knapp et al. ............... 210/151 |
| 3,053,390 A | | 9/1962 | Wood |
| 3,166,501 A | * | 1/1965 | Spohr ..................... 210/195.3 |
| 3,195,727 A | | 7/1965 | Kibbee |
| 3,202,285 A | | 8/1965 | Williams |
| 3,355,023 A | * | 11/1967 | Foster ..................... 210/195.4 |
| 3,393,804 A | | 7/1968 | Miller et al. |
| 3,419,146 A | | 12/1968 | Koulovatos |
| 3,841,998 A | * | 10/1974 | Farrell, Jr. ................ 210/622 |
| 3,964,998 A | * | 6/1976 | Barnard ..................... 210/605 |
| 3,994,802 A | * | 11/1976 | Casey et al. ............... 210/605 |
| 4,008,159 A | | 2/1977 | Besik |
| 4,029,575 A | * | 6/1977 | Bykowski et al. .......... 210/605 |
| 4,054,524 A | | 10/1977 | Mackrle et al. |
| 4,104,167 A | | 8/1978 | Besik |
| 4,139,457 A | | 2/1979 | Mackrle et al. |
| 4,146,471 A | | 3/1979 | Wyness |
| 4,341,630 A | | 7/1982 | Mackrle et al. |
| 4,390,422 A | | 6/1983 | Mackrle et al. |
| 4,430,215 A | | 2/1984 | Mackrle et al. |
| 4,585,556 A | | 4/1986 | Mackrle et al. |
| 4,650,585 A | * | 3/1987 | Hong et al. ................ 210/605 |
| 4,664,794 A | | 5/1987 | Mackrle et al. |
| RE32,429 E | * | 6/1987 | Spector ..................... 210/605 |
| 4,707,252 A | * | 11/1987 | Durot et al. ................ 210/151 |
| 4,919,815 A | * | 4/1990 | Copa et al. ................. 210/603 |
| 4,950,396 A | * | 8/1990 | Skaar et al. ............. 210/195.3 |
| 5,032,276 A | | 7/1991 | Mackrle et al. |
| 5,393,427 A | * | 2/1995 | Barnard ..................... 210/605 |
| 5,505,862 A | * | 4/1996 | Sonnenrein ................. 210/608 |
| 5,549,827 A | * | 8/1996 | Batson ....................... 210/519 |
| 5,603,833 A | | 2/1997 | Miller |
| 5,720,876 A | | 2/1998 | Mackrle et al. |
| 5,733,456 A | * | 3/1998 | Okey et al. ................. 210/605 |
| 5,755,966 A | | 5/1998 | Mackrle et al. |
| 5,766,459 A | | 6/1998 | Adams, Jr. |
| 5,830,351 A | | 11/1998 | Adams, Jr. |
| 5,951,860 A | | 9/1999 | Guy |
| 6,092,671 A | | 7/2000 | Ruehrwein et al. |
| 6,165,359 A | | 12/2000 | Drewery |
| 6,171,498 B1 | | 1/2001 | Fassbender et al. |
| 6,217,761 B1 | | 4/2001 | Catanzaro et al. |
| 6,224,773 B1 | | 5/2001 | Adams, Jr. |
| 6,352,643 B1 | * | 3/2002 | Kwon et al. ................ 210/605 |
| 6,398,957 B1 | * | 6/2002 | Mandt ........................ 210/605 |
| 6,444,125 B2 | * | 9/2002 | Han .......................... 210/605 |

* cited by examiner

APPARATUS AND METHODS FOR PURIFYING A WASTE INFLUENT MATERIAL

FIELD OF THE INVENTION

The present invention relates to waste material management, and more particularly to apparatus and methods for purifying a waste influent material.

BACKGROUND OF THE INVENTION

The fundamental principles of biological wastewater treatment including carbonaceous removal, nitrification and denitrification are well known in the industry. Biological oxidation of soluble organic matter with gravity sedimentation is also used to produce Mixed Liquor Suspended Solids ("MLSS"), for example, a flocculent biomass.

Recently, a number of treatment systems were developed to incorporate carbonaceous and ammonia oxidation in a single oxidation reactor vessel followed by gravity sedimentation of various materials to remove flocculent biomass prior to discharging the waste from the system. Such treatment systems can also be designed to collect flocculent biomass for return to the aerobic oxidation reactor. Nitrate nitrogen can be formed by the biological oxidation of ammonia nitrogen in a dual purpose (carbonaceous plus nitrogen oxidation) reactor. Carbonaceous material acts as an electron donor such that the nitrate nitrogen can be reduced to nitrogen gas by denitrifying organisms under anoxic or low dissolved oxygen conditions.

Treatment systems have been developed that incorporate an influent anoxic zone followed by an oxidation zone and either an external or an internal sedimentation tank to recycle the nitrified mixed liquor as it travels from the oxidation zone to the anoxic zone. Therefore, carbonaceous removal, nitrification and denitrification can be provided in a three reactor zone system with internal recycling capabilities. Some systems have used multiple stages of the oxidation/anoxic zone principle to achieve increased nitrogen removal efficiency.

Critical elements for effective methods and apparatus incorporating the three zone concept include the efficient sedimentation of flocculent biomass and adequate maintenance of the proper fluid communication within the sedimentation zone to promote efficient flocculated biomass separation. A severe shortcoming of existing methods and apparatus for wastewater treatment is the inability to match or vary sedimentation fluid flow and efficiency. There is a need to account for settleability changes of the flocculated biomass that contain three separate and unique classifications of bacteria. For example, variation of the influent wastewater characteristics and/or variation of the oxidation and/or anoxic reactor parameters can affect the morphology and settleability of the combined biomass.

Other shortcomings of existing systems include: the improper degasification of nitrogen during denitrification, the inability to decouple the recycle rate from the oxidation zone to the anoxic zone, the inability to control the recycle rate from the oxidation zone to the anoxic zone based on diurnal changes in influent flow rate, the influent total nitrogen concentration, and the overall lack of inherent or automatic process control and stability.

SUMMARY OF THE INVENTION

Accordingly, it is an object of the present invention to obviate problems and shortcomings of conventional apparatus and methods used for wastewater treatment. More particularly, it is an object of the present invention to provide apparatus and methods for purifying a waste influent material.

In addition, it is an object of exemplary embodiments of the present invention to provide apparatus and methods that materially enhance the quality of the environment by purifying waste influent material.

To achieve the foregoing and other objects in accordance with the present invention, exemplary embodiments of the invention are directed to apparatus for purifying a waste influent material comprising an anoxic zone, an aeration zone in communication with the anoxic zone, and a sedimentation zone in communication with the aeration and anoxic zones. The sedimentation zone is defined by a plurality of boundaries including a first boundary and a second boundary. The sedimentation zone comprises an inlet defined by the first boundary to receive material from the aeration zone. The sedimentation zone further includes a first outlet in a lower portion of the sedimentation zone to recycle material from the sedimentation zone to the anoxic zone. The sedimentation zone still further includes a second outlet in an upper portion of the sedimentation zone adapted to release purified effluent material from the apparatus.

Additional exemplary embodiments of the invention are directed to apparatus for purifying a waste influent material comprising an anoxic zone, an aeration zone in communication with the anoxic zone, and a sedimentation zone in communication with the aeration and anoxic zones. The sedimentation zone is defined by a plurality of boundaries including a first boundary and a second boundary. The sedimentation zone comprises an inlet defined by the first boundary to receive material from the anoxic zone. The sedimentation zone further includes a first outlet in a lower portion of the sedimentation zone to recycle material from the sedimentation zone to the aeration zone. The sedimentation zone still further includes a second outlet in an upper portion of the sedimentation zone adapted to release purified effluent material from the apparatus.

In further exemplary embodiments, the invention is directed to an apparatus for purifying a waste influent material comprising an anoxic zone, an aeration zone in communication with the anoxic zone, and a sedimentation zone in communication with the aeration zone. The sedimentation zone is defined by a plurality of boundaries including a first boundary and a second boundary. The first boundary includes a first portion and a second portion extending at an angle with respect to the second boundary. The first portion of the first boundary is offset from and overlaps an interior surface of the second portion of the first boundary to define an overlapped area therebetween. The first and second portions of the first boundary therefore define an inlet comprising the overlapped area.

In still further exemplary embodiments, the invention is directed to a sedimentation zone for purifying a waste influent material comprising a first boundary including a first portion and a second portion. The second portion is offset from an interior surface of the first portion to define an overlapped area therebetween. The first and second portions of the first boundary therefore define an inlet comprising the overlapped area. The sedimentation zone further comprises a second boundary extending at an angle with respect to the second portion of the first boundary. In addition, a device is positioned relative to the inlet and is adapted to manipulate a material flow profile as material travels into the sedimentation zone. As described below, the material flow profile can refer to various flow profile characteristics including such flow profile parameters as velocity gradients, velocity, acceleration, directional vectors, or the like of combinations thereof. Moreover, the flow profile characteristics can include changes in the flow profile parameters.

In still additional embodiments of the present invention a device for controlling a recycle material flow rate is provided. The device includes a container and a sensing device positioned with respect to the container and adapted to sense the fluid level in the container. The controlling device further includes a control valve assembly in communication with the sensing device. The control valve assembly comprises a control valve adapted for adjustment to a predetermined setting based on the fluid level in the container.

In yet additional exemplary embodiments, the invention is directed to methods for purifying a waste influent material comprising the steps of introducing a waste influent material to an anoxic zone, transferring material from the anoxic zone to an aeration zone, and transferring material through an inlet from the aeration zone to a sedimentation zone. The sedimentation zone is defined by a plurality of boundaries including a first boundary and a second boundary, wherein the inlet is defined by the first boundary. The sedimentation zone is also provided with a first outlet in a lower portion of the sedimentation zone and a second outlet in an upper portion of the sedimentation zone. In addition, material is transferred through the first outlet to recycle material from the sedimentation zone to the anoxic zone. In addition purified material is released from the sedimentation zone through the second outlet.

In yet additional exemplary embodiments, the invention may be directed to methods for purifying a waste influent material comprising the steps of introducing a waste influent material to an aeration zone, transferring material from the aeration zone to an anoxic zone, wherein the material in the anoxic zone includes a carbon source. The material is transferred through an inlet from the anoxic zone to a sedimentation zone. The sedimentation zone is defined by a plurality of boundaries including a first boundary and a second boundary, wherein an inlet is defined by the first boundary. The sedimentation zone is also provided with a first outlet in a lower portion of the sedimentation zone, and a second outlet in an upper portion of the sedimentation zone. Material is transferred through the first outlet to recycle material from the sedimentation zone to the aeration zone. In addition, purified material is released from the sedimentation zone through the second outlet.

These and additional advantages of the apparatus and methods according to the invention will be more apparent in view of the following detailed description.

BRIEF DESCRIPTION OF THE DRAWINGS

The following detailed description will be more fully understood when viewed together with the drawings in which.

DETAILED DESCRIPTION OF EXEMPLARY EMBODIMENTS

Figure 1:
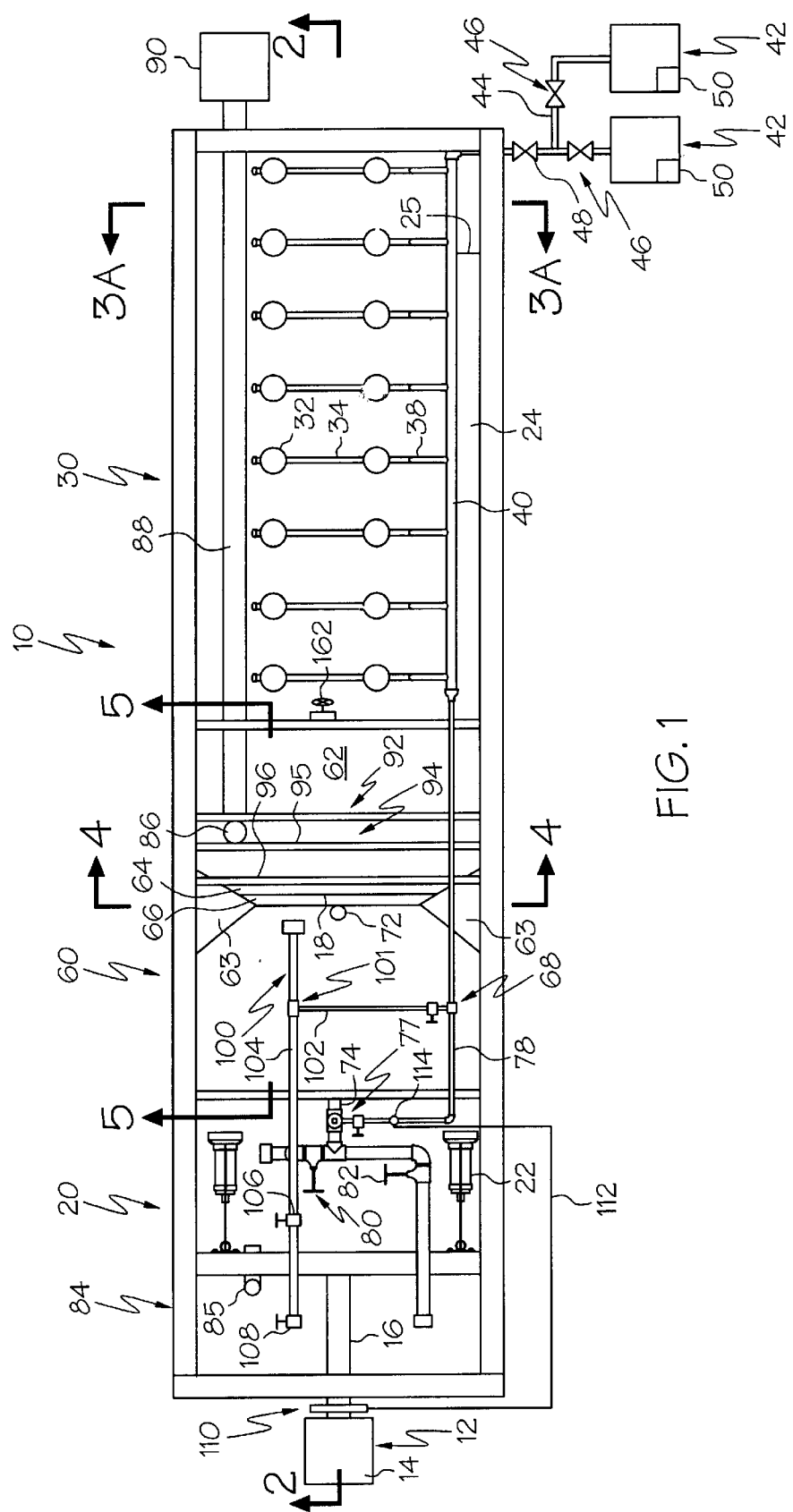
FIG. 1 is a top view of portions of a wastewater treatment apparatus in accordance with the present invention.

FIG. 1 is a top view of portions of an exemplary apparatus 10 for purifying a waste influent material 14 in accordance with the present invention. An outer shell 52 of the apparatus may be constructed of a wide variety of materials depending on the size and specific application requirements. For example, the outer shell 52 may be constructed of mild steel, stainless steel, PVC, fiberglass, precast concrete or other suitable noncorrosive material. The outer shell 52 of the apparatus can also be mounted on a concrete slab (above or below ground level), or as a partially buried tank as required by the system or to accommodate other site conditions.

As described more fully below, the exemplary apparatus 10 generally comprises an anoxic zone 20 adapted for receiving waste influent material 14 and transferring material to an aeration zone 30. The aeration zone 30 is adapted for transferring material to the sedimentation zone 60. As also described below, alternative zone arrangements may be provided in accordance with the principles of the claimed invention.

A source 12 of waste influent material 14 is also provided to introduce waste influent material 14 to the apparatus 10. The waste influent material (also referred to as wastewater) may comprise one or more liquids, solids, or a homogenous solution or heterogeneous mix or slurry of solids and liquids. In one example, the waste influent material can include soluble organics. The source 12 can comprise a containment tank, reservoir, conduit, or the like. In still further embodiments, the source 12 may comprise a pretreatment apparatus to initially process the wastewater 14 prior to introducing the wastewater 14 to the apparatus 10.

In order to dispense the wastewater 14, the source 12 may include a device, such as a conduit 16, to permit communication (e.g., fluid communication) with the apparatus 10. As shown in the exemplary embodiment of FIG. 1, the conduit 16 provides communication between the source 12 and the anoxic zone 20 of the apparatus 10. Although not shown, a grate or other access restricting device may be located at the opening into the anoxic zone in order to prevent unauthorized access and/or to act as a safety device.

It is also contemplated that the source 12 may be in direct communication (e.g., fluid communication) with the apparatus 10, for example, by directly coupling the source 12 to the apparatus 10. In still further embodiments, the source 12 can be arranged to dispense wastewater into the apparatus 10, for example, by arranging portions of the source 12 above portions of the apparatus 10 to permit communication by pouring wastewater 14 into the apparatus 10. In any case, the source 12 can be designed to introduce wastewater 14 to the apparatus 10 at sufficient flow rates to accommodate peak flow requirements of the apparatus 10.

The anoxic zone 20 may include one or more mixers 22 designed to agitate the material contained in the anoxic zone 20. In one particular embodiment, the one or more mixers 22 are submerged below a material level 11 (e.g., see FIG. 2) of the anoxic zone 20 in use. For example, the one or more mixers 22 can be located adjacent the bottom of the anoxic zone to agitate otherwise stagnant material in the lowermost portions of the anoxic zone 20.

Figure 4:
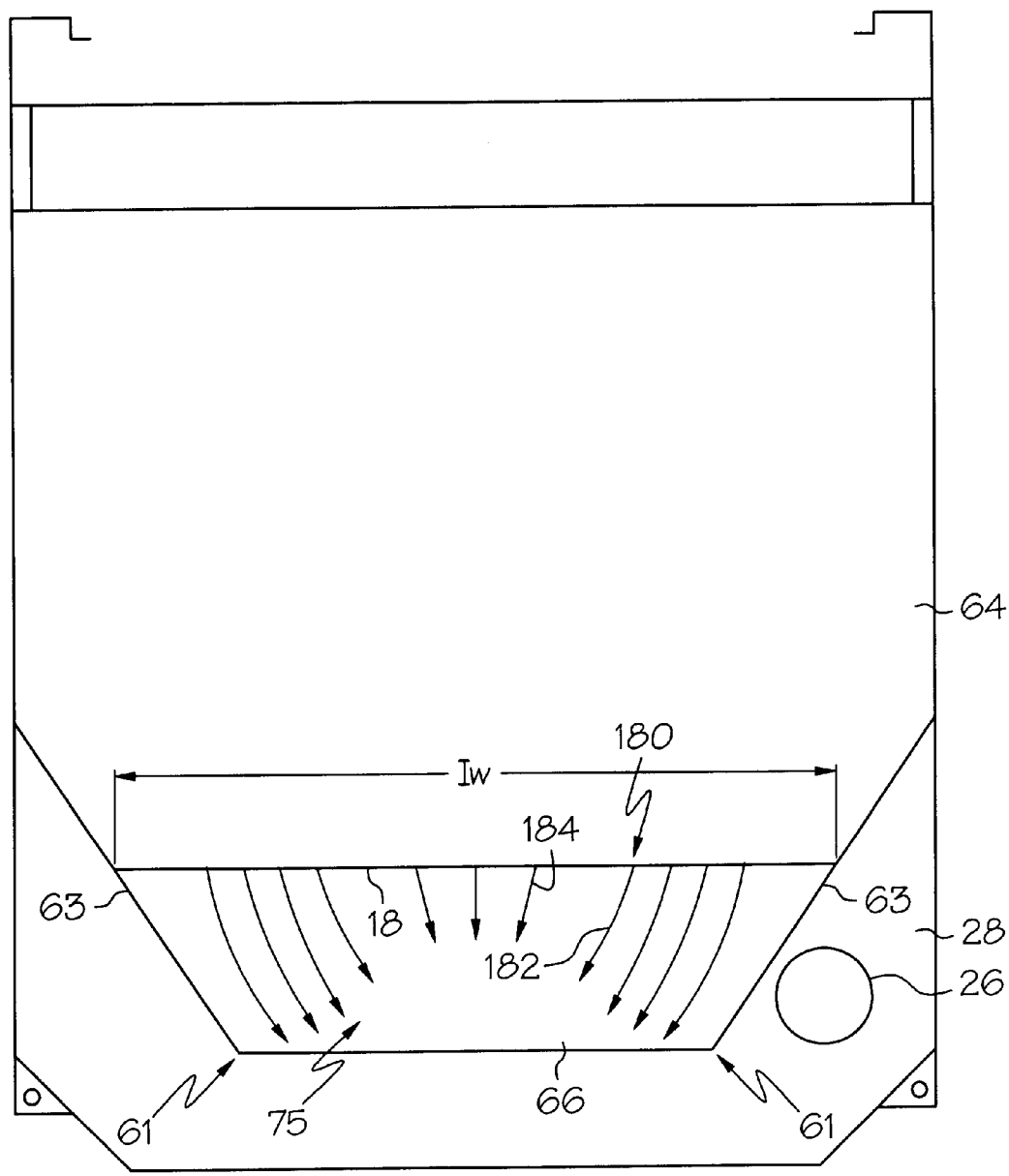
FIG. 4 is a cross section through the sedimentation zone along line 4—4 of FIG. 1.

The anoxic zone 20 is in communication (e.g., fluid communication) with the aeration zone 30. In one embodiment, as shown in FIG. 4, the anoxic zone 20 can include one or more outlets (e.g., see 26 in FIG. 4) for communication through a boundary, such as a lower partition 28, that otherwise assists in segregating the anoxic zone 20 from the aeration zone 30. The boundary, if provided, may comprise a wall, partition, baffle plate, clarifier side walls, or the like.

In one exemplary embodiment, the outlet 26 can include a conduit 24 to permit material flow from the anoxic zone 20 to the aeration zone 30. Such a conduit may comprise steel, polyvinyl chloride ("PVC"), fiberglass, or other suitable material. The conduit 24, if provided, can be located to provide either plug flow, complete mix or a combination of either in the aeration zone 30. Moreover, an end 25 (see FIG. 1) of the conduit 24 may be sufficiently offset from the sedimentation zone 60 to prevent material from passing directly from the anoxic zone to the sedimentation zone.

In other embodiments, the anoxic zone 20 can also be arranged in direct communication (e.g., fluid communication) with the aeration zone 30, for example, by directly coupling the anoxic zone 20 to the aeration zone 30. In still further embodiments, the anoxic zone 20 can be arranged to dispense fluid into the aeration zone 30, for example, by arranging portions of the anoxic zone 20 above portions of the aeration zone 30 to permit communication by pouring material into the aeration zone 30. In all cases, the anoxic zone 20 can be designed to introduce material to the aeration zone 30 at sufficient flow rates to accommodate peak flow requirements of the apparatus 10.

The aeration zone 30 includes one or more aeration devices 32 which assist in dissolving oxygen in the wastewater 14 to support process reactions including carbonaceous removal and nitrification of influent ammonia. The oxygen can be obtained from an oxygen source such as the surrounding atmosphere, an oxygen tank, or the like. The aeration devices 32, if provided, may comprise a device adapted to produce course bubbles, fine bubbles, or other bubble patterns. For example, the device may comprise one or more diffusers, of sufficient size, quantity and placement to aerate and mix the wastewater to facilitate distribution of dissolved oxygen throughout the aeration zone 30. In exemplary designs, other devices may also be used that increase air transfer efficiency and decrease power consumption of the apparatus 10.

Figure 3A:
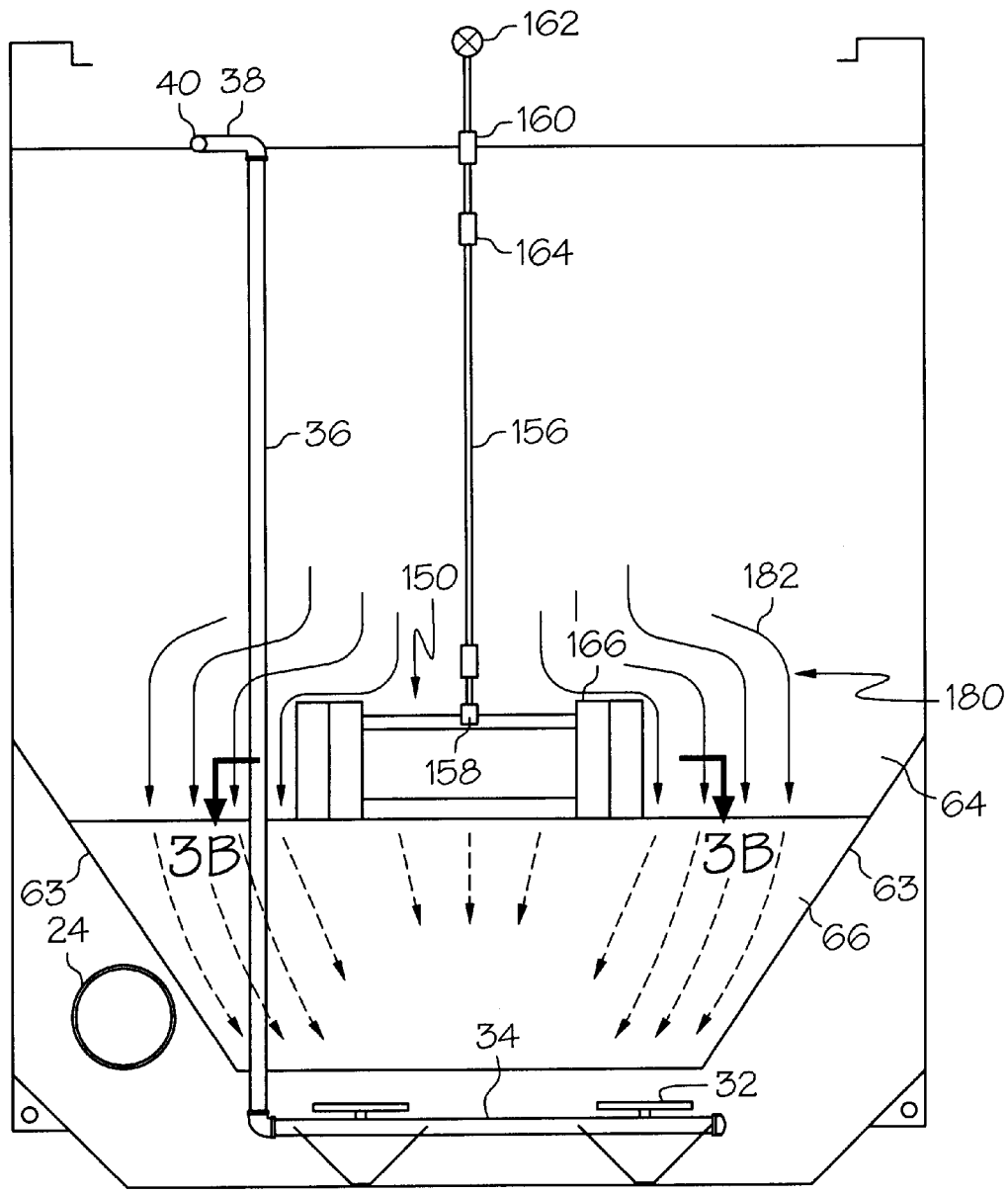
FIG. 3A is a sectional view through the aeration zone along line 3A—3A of FIG. 1.

To enhance the performance of the aeration devices 32, they may be arranged in pairs of two in series along a lower conduit 34. As best illustrated in FIG. 3A, each pair of aeration devices 32 may be provided with a substantially vertical conduit 36 and upper conduit 38. Air traveling through an air supply header conduit 40 may then travel through the upper conduit 38, down the vertical conduit 36 and across through lower conduit 34 to supply air to the corresponding pair of aeration devices 32.

The air supply header conduit 40 is connected to one or more blowers 42 of sufficient size to meet all aeration requirements of the aeration zone 30, system lift pumps, and/or other components of the apparatus. The one or more blowers 42 may be varied in size and capacity to meet average and peak air supply needs. If two such blowers 42 are provided, they may be connected by conduit 44. Each blower 42 can also be provided with an isolation valve 46. Air supply may be controlled manually or automatically by an air control valve 48 and/or blower speed controls 50.

The apparatus 10 is designed to permit communication (e.g., fluid communication) between the aeration zone 30 and a sedimentation zone 60. The sedimentation zone 60 is defined by a plurality of boundaries including a first boundary 62 and a second boundary 68. Boundaries in accordance with the present invention can comprise any element designed to at least partially contain material in the sedimentation zone 60. For example, exemplary boundaries can comprise one or more of an end wall, partition, membrane, prefabricated modular panels, rigid or flexible wall, or the like. In addition, boundaries constructed in accordance with the present invention can be fabricated from a wide range of materials such as mild steel, stainless steel, fiberglass, PVC or other suitable noncorrosive materials.

In the exemplary embodiment illustrated in the figures, the first and second boundaries 62 and 68 are formed as partitions, such as prefabricated modular panels, that are inserted within the interior of the outer shell 52 to form the sedimentation zone between the anoxic zone 20 and the aeration zone 30. The lower partition 28 then extends from the bottom of the sedimentation zone 60 to the bottom wall of the outer shell 52 to further segregate the anoxic zone 20 from the aeration zone 30. While not shown, an additional support device, such as a bottom support shoe, or other member may be provided to further support the sedimentation zone 60 on the bottom wall of the outer shell 52 and/or to further segregate the anoxic zone 20 from the aeration zone 30. Moreover, one of ordinary skill will appreciate that the other construction designs may be employed and that the sedimentation zone 60 does not necessarily have to be positioned between the anoxic and aeration zones. Thus, rather than forming the boundaries as partitions, the boundaries may be constructed as another boundary type (e.g., end walls) that are not located adjacent one or both of the anoxic and/or aeration zones.

Figure 2:
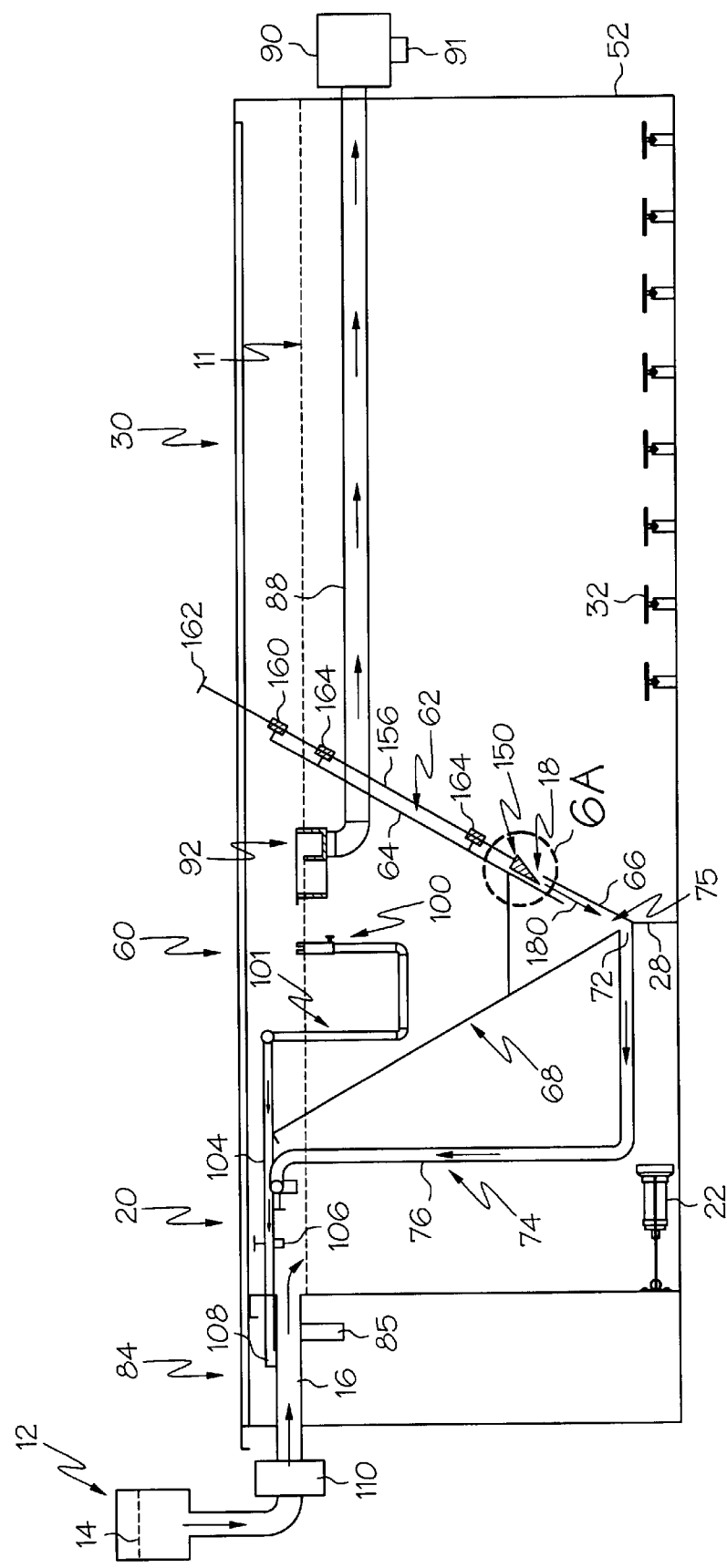
FIG. 2 is a longitudinal section of the wastewater treatment apparatus along line 2—2 of FIG. 1.

The sedimentation zone 60 may also be provided with an inlet 18 to permit communication (e.g., fluid communication) between the sedimentation zone 60 and the aeration zone 30. As shown in FIG. 2, the inlet 18 permits transferring of material along a material flow profile 180 from the aeration zone 30 into the sedimentation zone 60. The material flow profile can refer to various flow profile characteristics including such flow profile parameters as velocity gradients, velocity, acceleration, directional vectors, or the like or combinations thereof. Moreover, the flow profile characteristics can include changes in the flow profile parameters.

Figures 6A, 6B, 6C:
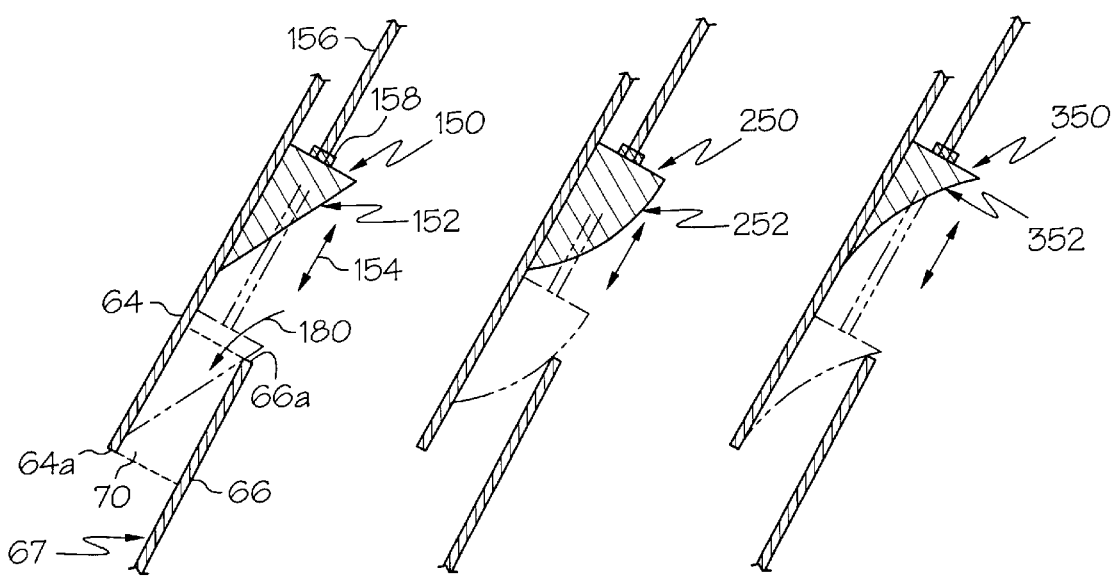
FIG. 6A is an enlarged view of a device relative to an inlet of the sedimentation zone taken at view 6A of FIG. 2.
FIG. 6B is an enlarged view of a second embodiment of a device in accordance with the present invention.
FIG. 6C is an enlarged view of a third embodiment of a device in accordance with the present invention.

The inlet 18 can comprise a passage, aperture, spacing, or the like. In one embodiment, the first boundary 62 can comprise a first upper portion 64 and a second lower portion 66. The inlet 18 can formed by spacing the first portion 64 and a second portion 66. For example, as best shown in FIGS. 2, 6A, 6B, and 6C, the inlet 18 can be formed by offsetting the first portion 64 from an interior surface 67 of the second portion 66. Although not necessary, the first and second portions can overlap to define an overlapped area 70 therebetween. As shown in FIG. 6A, for example, the overlapped area 70 extends from an outer end 64a of the first portion 64 to the outer end 66a of the second portion 66. In addition, the inlet may be located at any vertical position along the first boundary 62 (e.g., at a lower portion of the first boundary 62). In exemplary embodiments, the inlet is located in the lower half of the sedimentation zone that includes a lower area 75 of the sedimentation zone 60. For example, the outer end 66a of the second portion 66 can be located in a lower portion of the sedimentation zone. In particular embodiments, the outer end 66a of the second portion 66 can be located in the lower half of the sedimentation zone.

Figure 5:
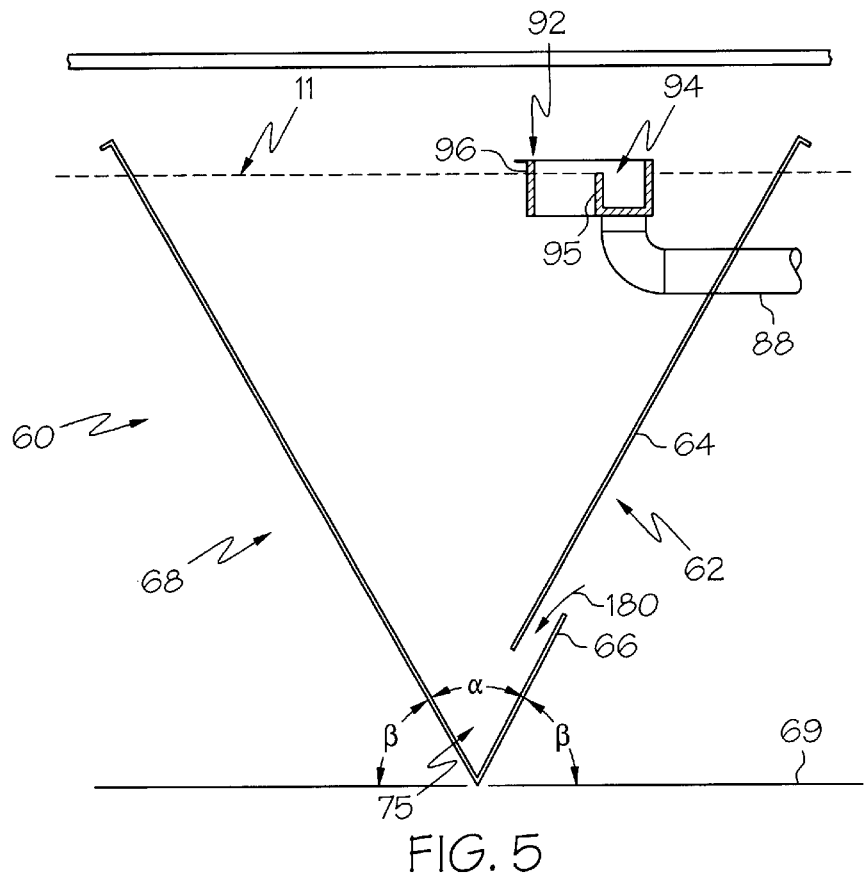
FIG. 5 is a cross-sectional view through the sedimentation zone along line 5—5 of FIG. 1.

As best shown in FIGS. 5 and 6A, the inlet can be constructed to direct a material flow profile 180 toward the lower area 75 of the sedimentation zone 60. One structure that can perform this function is achieved by offsetting the first portion 64 from the interior surface 67 of the second portion 66 to facilitate a downwardly directed material flow profile 180. In exemplary embodiments (e.g., see FIG. 6A), the first and second portions 64 and 66 are parallel with respect to one another t permit a constant controlled velocity as the material travels through the overlapped area 70.

Although not shown, the first and second portions 64 and 66 can be oriented such that they are not parallel with respect to one another to increase or decrease the material velocity as it travels through the overlapped area 70. In additional exemplary embodiments, the first and second portion may be offset and not overlapped to achieve a different distribution of material as it travels into the sedimentation tank. Still further, the spacing between the first and second portions can be achieved by positioning the first and second portions such that they are substantially coplanar and spaced from one another. Such a coplanar arrangement could diffuse the wastewater as it enters the sedimentation zone.

As shown in FIG. 2, the arrangement of the first and second portions 64 and 66 of the first boundary 62 can assist in generating a material flow profile 180 as material travels into the sedimentation zone 60. In fact, the flow profile 180 directs material toward the lower area 75 of the sedimentation zone 60 for disbursement, such as flushing or sweeping, of solids that might otherwise collect in the lower area 75 of the sedimentation zone 60. Disbursement enhances the performance of the sedimentation zone by reducing or preventing coagulation or clumping of material at the lower area 75 of the sedimentation zone.

The lower area 75 of the sedimentation zone 60 may also include one or more outlets adapted to recycle material from the sedimentation zone to the anoxic zone in order to increase the efficiency of the apparatus. For example, the sedimentation zone 60 may comprise a first outlet 72 (see FIGS. 1 and 2) to recycle material from the sedimentation zone 60 to the anoxic zone 20. As shown in FIG. 2, the first outlet 72 can include a conduit 74 adapted to reintroduce the material at an offset location from the anoxic zone outlet 26.

The conduit 74 can include a vertical section 76 provided with an airlift pump (see generally at 77 in FIG. 1). The air lift pump 77 is powered by an air supply line 78 that is in fluid communication with the air supply header conduit 40. A valve assembly 80 can be provided to regulate material being recycled to the anoxic zone 20 while a second valve assembly 82 can be provided to periodically empty material, such as sludge, from the sedimentation zone 60 to a sludge zone 84.

An overflow conduit 85 may also be provided to recycle liquid material from the sludge zone 84 to the anoxic zone 20. For example, sludge material entering the sludge zone 84 will tend to settle such that solid waste will settle towards the bottom of the sludge zone 84 while the less-dense liquid will tend to rise towards the upper portion of the sludge zone. Therefore, when liquid in the sludge zone 84 rises above a predetermined level, the liquid will spill through the overflow conduit 85 to the anoxic zone 20 for recycling through the apparatus.

Figure 7:
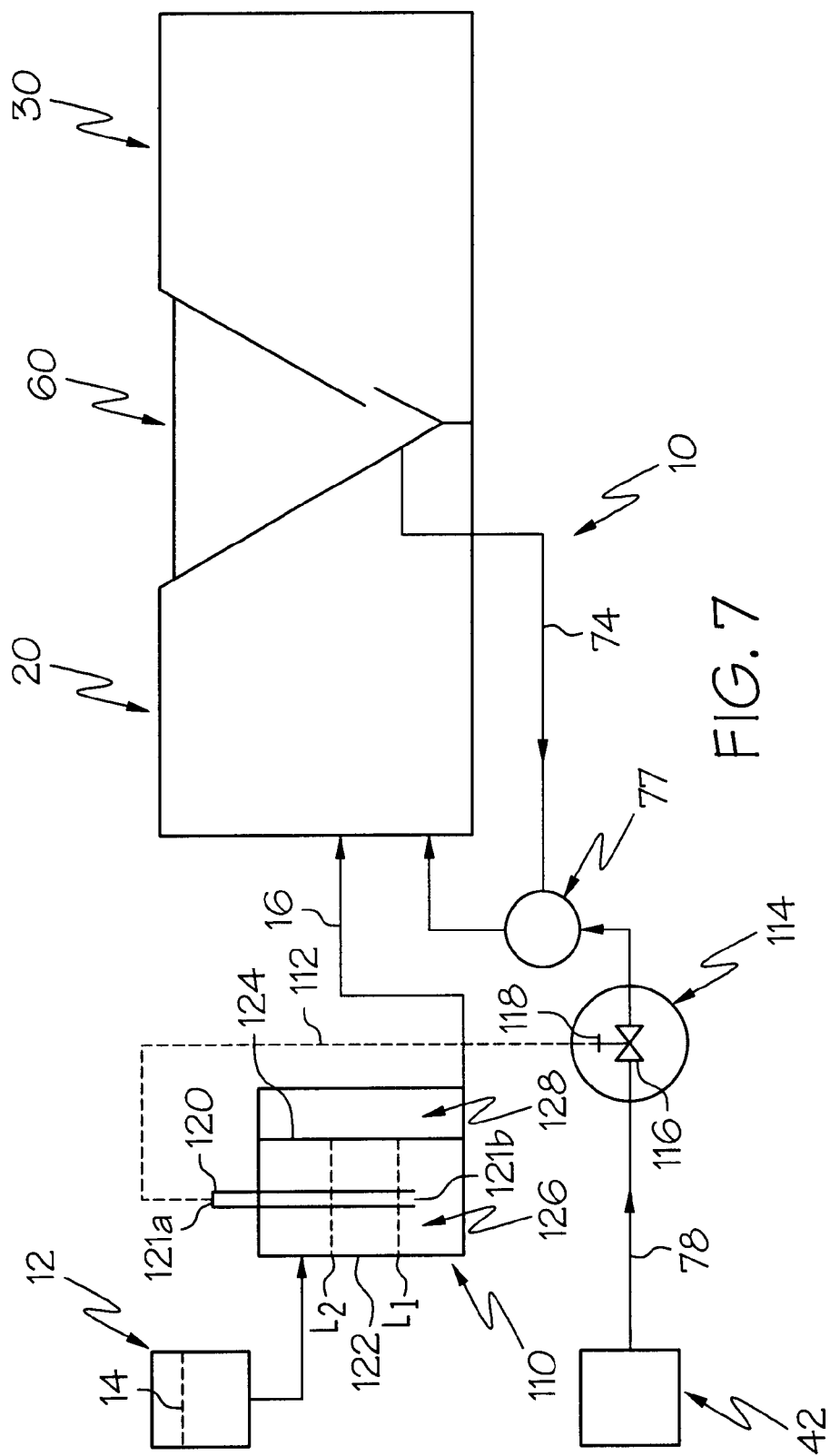
FIG. 7 shows a schematic view of elements of the exemplary apparatus.

As best illustrated in FIGS. 1 and 7, an optional device 110 may be provided that is adapted to facilitate control of a recycle material flow rate from the sedimentation zone 60 to the anoxic zone 20 based on a waste influent material flow rate. A pressure line 112 transmits a pressure corresponding to the waste influent material flow rate to a control valve assembly 114 adapted to control the air flow to the air lift pump 77. As shown in FIG. 7, the valve assembly 114 includes an air lift control valve 116 adapted to control air flow through the air supply line 78. An actuator 118 may be provided to actuate the control valve 116. For example, a low pressure air diaphragm 118 can be provided in pressure communication with the pressure line 112 to serve as an actuator for the air lift control valve 116.

The device 110 may also include a container 122 to receive a flow of waste influent material. The device 110 can also be constructed to resist material flow to accumulate material in the container. For example, an obstacle 124, such as a spill plate, restrictor member, or other device may be provided and can partially or completely divide the container 122 into a first area 126 and a second area 128. The device 110 further includes a sensing device, such as an inverted pressure tube 120, positioned with respect to the container and adapted to sense a fluid level in the container. In exemplary embodiments, the sensing device is positioned within the first area 126 of the container 122. The inverted pressure tube 120, if provided, includes a closed upper end 121a and open lower end 121b such that the pressure inside the tube 120 is sensitive to the fluid level in the first area 126. The obstacle 124 restricts influent material flow to cause the fluid level to raise within the first area 126 prior to being released to the second area 128. Once in the second area 128, the material may be transferred (e.g., drain under the force of gravity) to the anoxic zone 20 of the apparatus 10. In exemplary embodiments, at a constant first influent material flow rate, the material may accumulate in the first area 126 to an equilibrium level $L_1$. Any increase in the influent material flow rate will result in a corresponding equilibrium level increase in the first area 126. For example, tripling the influent material flow rate might cause a corresponding increase in the equilibrium level (e.g., to equilibrium level $L_2$). Such an increase in the equilibrium level will result in a corresponding increase in pressure within the pressure tube 120. The increased tube pressure is transmitted by the pressure line 112 to the actuator 118. In response, the actuator 118 thereafter actuates the air lift control valve 116 to open or close to a predetermined setting depending on the particular pressure within the pressure line 112. In one example, an increase in inlet material flow rate can cause the control valve 116 to open a predetermined amount to increase air flow to the air lift pump 77, thereafter increasing the recycle rate of material through the conduit 74. In another example, a decrease in material flow rate may cause the control valve 116 to close a predetermined amount to decrease the air flow in the air lift pump 77 thereafter decreasing the recycle rate of material through the conduit 74.

As shown in FIG. 5, the sedimentation zone 60 can have a substantially Vshaped cross-sectional profile. In exemplary embodiments, the second boundary 68 and the second portion 66 of the first boundary 62 are connected to one another at a lowermost portion of the sedimentation zone 60 at an angle α with respect to one another. While various relative angles may be used, exemplary angles α can range from approximately 30° to approximately 70°. In more particular examples, exemplary angles α can range from approximately 30° to approximately 60°. In addition, the sedimentation zone 60 may be substantially vertically aligned with substantially equal acute angles β between a horizontal axis 69 and portions of each of the first and second boundaries to define a substantially upright V-shaped sedimentation zone. While various acute angles can be used, exemplary acute angles β can range from approximately 55° to approximately 75°. In more particular examples, the acute angles β can range from approximately 60° to approximately 75°.

The substantially angled nature of the first boundary 62 is also environmentally friendly and provides safe system properties. Excess air from the aeration devices 32 in the oxidation zone 30 coalesces on the exterior surface of the sedimentation zone 60 and then flows to the surface along the first boundary 62 of the sedimentation zone to reduce aerosol emissions and associated health hazards from the oxidation/sedimentation zone components.

As best shown in FIG. 1, the sedimentation zone 60 may further include a second outlet 86 in an upper portion to release purified effluent material from the apparatus 10. As shown in FIGS. 1, 2 and 5, the second outlet 86 may comprise a conduit 88 to provide a path for the effluent material to follow as it leaves the apparatus. In one example, the conduit 88 may direct the effluent material to a treatment zone 90 prior to dispensing through outlet 91. The treatment zone 90 could chlorinate or otherwise further treat the effluent material.

The second outlet 86 can also be provided with a filtering device 92 adapted to reduce or eliminate material floating at the material level 11 from entering the second outlet 86. As best illustrated in FIG. 5, a trough 94 is positioned and in communication with the second outlet 86 such that material spilling over the spill wall 95 will exit through the second outlet 86. A blocking plate 96 is also arranged to prevent floating material from reaching the spill wall 95.

Floating material can also be removed by an optional skimmer 100 as best shown in FIGS. 1 and 2. The skimmer 100 can include an air lift pump (see generally at 101) with air supplied by air supply line 102. The size, type, number and location of the skimmers may vary depending on the surface area of the sedimentation zone, influent waste characteristics and the like. A conduit 104 may either redirect the material (e.g., floating sludge) to first outlet 106 for recycling back to the anoxic zone 20 or may direct the material to be dispensed through a second outlet 108 to be dispensed in the sludge zone 84.

The sedimentation zone 60 may also be provided with an optional device 150 positioned relative to the inlet 18 and adapted to manipulate a material flow profile 180 as material travels into the sedimentation zone 60. The device 150, if provided, may be constructed from steel, PVC, fiberglass or other suitable material. The device shape is useful to control the material flow profile 180 and how the profile 180 changes if the device 150 is adjusted relative to the inlet 18. In one embodiment, the device 150 may comprise a generally triangular-shaped wedge member although the device may be constructed in other shapes depending on the desired material flow profile characteristics. As shown in broken lines in FIG. 6A, the device 150 can be selectively adjusted to at least partially enter the overlapped area 70. While a stationary device may be used, adjustable devices allow the material flow profile 180 to be changed, for example, to accommodate varying process parameters.

The shape of the device 150 may be selected to facilitate the change in the material profile as the device is adjusted. For example, as illustrated in FIG. 6A, the device 150 can have a substantially planar outer surface 152 facing away from the first portion 64 of the first boundary 62. Furthermore, angling the planar outer surface 152 with respect to the first portion 64 allows a linear reduction in the inlet area depending on the location of the device 150 relative to the inlet, particularly when the device 150 begins entering the overlap zone 70.

Although exemplary relationships are shown, it is contemplated that the outer surface 152 can have a wide variety of relationships with respect to the first portion 64 of the first boundary 62. For example, if the inlet opening is flared outward with the first portion 64 being angled with respect to the second portion 66, a linear reduction in area can be achieved even if the outer surface of the device 150 is substantially parallel to the first portion 64. FIG. 6B illustrates an alternative device 250 with a substantially convex outer surface 252 while FIG. 6C depicts yet another device 350 with a substantially concave outer surface 352. The convex and concave outer surfaces permit various nonlinear inlet area reduction properties as the device is adjusted with respect to the inlet. It is contemplated that the outer surface may comprise various curvilinear or other shapes to facilitate formation of the appropriate material flow profile to achieve optimum disbursement, such as flushing or sweeping, in the sedimentation zone.

The material flow profile can have a velocity gradient in the sedimentation zone 60 defined by the following are defined by the following equation "A".

$$G = [P/Vu]^{1/2} \quad (A)$$

Where,
    G=Velocity gradient, ft/sec/ft
    u=Absolute fluid viscosity, lb-sec/ft$^2$;
    V=Sedimentation zone vertical segment volume, ft$^3$
    P=Power in recycle stream ft×lb/sec For embodiments where the apparatus includes a device 150 adjacent the inlet 18, "P" in equation (A) is given as:

$$P = Qwh_t \quad (B)$$

Where,
    P=Power in recycle stream ft×lb/sec
    Q=Recycle rate (ft$^3$/sec)
    ht=Head loss (ft)
    w=Fluid density (slugs/ft$^3$)

Turning back to FIG. 6A, as with all embodiments of the device, the position of the device 150 may be adjusted with respect to the inlet 18. In the embodiment of FIGS. 6A–6C, the adjustment is along a substantially linear path 154 that can be parallel to the first portion 64 of the first boundary 62. While the device may have a large range of adjustment stroke lengths, exemplary embodiments include devices with stroke lengths ranging from 1–12 inches. In order to provide this adjustment stroke length, a large variety of mechanisms may be provided for manual or automated control of the device position relative to the inlet. For example, a rotatable control rod 156 may be attached with a swivel mount 158 to the device 150. The control rod 156 can have an outer surface with a threaded portion to engage a drive nut 160 (see FIG. 2). A handle 162, such as a wheel, can be manually turned to cause translation of the device 150 in response to axial rotation and translation of the control rod 156 relative to the drive nut 160. Bushings 164, or additional drive nuts, may also be provided to rotatably support the control rod relative to the sedimentation zone 60. While the device 150 is described as being manually adjustable, it is contemplated that the device may have an electromechanical adjustable device and may even include a programmed or feedback control mechanism to allow the device to adjust depending on activation by a user, output of a program or feedback from the apparatus.

Figure 3B:
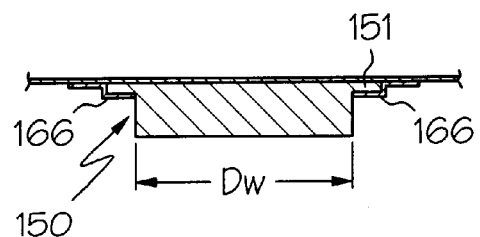
FIG. 3B is a sectional view through a device adapted to manipulate a material flow profile along line 3B—3B of FIG. 3A.

As best illustrated in FIGS. 3A and 3B, devices in accordance with the present invention, if provided can include retaining brackets 166 to provide a groove to retain a tongue 151 of the device 150. The tongue 151 can be separately attached to the device or can be formed integrally with the device. The tongue and groove arrangement is one exemplary embodiment that can facilitate the linear movement of the device 150 along path 154.

The devices (e.g., 150, 250, 350) discussed above, if provided, are adapted to manipulate a material flow profile 180 as material travels into the sedimentation zone. The devices 150 may have a device width ($D_w$) (see FIG. 3B) that is substantially equal to the inlet width ($I_w$) (see FIG. 4) of inlet 18 to allow the device to block substantial or all material flow through the inlet 18. As best shown in FIG. 3A, the device width ($D_w$) can be less than the inlet width ($I_w$) to permit material flow through the inlet 18 at any adjusted position of the device with respect to the inlet 18. While the device 150 and inlet width may be designed with a large range of widths, including numerous relative widths, devices 150 can have exemplary widths ($D_t$) ranging from 4–8 feet while the inlet widths ($I_w$) can range from 6–14 feet. In addition, while a single device is illustrated with respect to the exemplary embodiments, a plurality of devices may be provided to assist in manipulating the material flow profile 180.

As shown in FIGS. 3A and 4, the device 150 manipulates a material flow profile 180 such that fluid flow is encouraged to enter the inlet 18 at positions adjacent the device 150. For example, the device 150 can act as an obstacle to encourage a diverted profile 182 around the device 150. When not fully adjusted to block off portions of the inlet 18, portions 184 of the material profile may pass through the inlet 18 adjacent the device.

Accordingly, as illustrated in FIGS. 3A and 4, an enhanced material profile may be provided wherein increased fluid velocity and/or fluid flow may be achieved at bottom end portions 61 of the sedimentation zone to discourage coagulation or clotting of material in the lower portions of the sedimentation zone, particularly at the bottom end portions. In order to further remove dead zones that typically occur at corners located at the bottom ends of the sedimentation zone, the lower portion of the sedimentation zone 60 can be truncated, for example, by providing inwardly directed lateral boundaries 63.

To further enhance the performance of the sedimentation zone 60, the device 150 may be positioned adjacent the first boundary 62 and the first outlet 72 may be opposed from the device and adjacent the second boundary 68, whereby the device acts to redirect the flow profile away from the first outlet 72. In one particular example, the device 150 may be positioned adjacent a center portion of the first boundary 62 while the first outlet 72 of the sedimentation zone 60 is positioned adjacent a center portion of the second boundary 68. As shown in FIG. 2, the device 150 and first outlet 72 may be substantially aligned along a central cross-sectional plane with the device 150 being located above the first outlet 72. In such a relative position, the device 150 and first outlet 72 cooperate to enhance feedback of material through the first outlet 72. For example, rather than allowing material to flow directly into the first outlet 72, the device may manipulate a large portion of the material profile (see portions 182) away from the first outlet 72 and toward the bottom end portions 61 of the sedimentation zone.

Multiple devices 150 and outlets 72 can be provided depending on the system requirements. In one alternative example, multiple devices are paired with outlets such that each device is adjacent and spaced from one another along the first boundary and a corresponding outlet is opposed from the device adjacent the second boundary. As described above, this opposed relationship will assist in redirecting the material flow profile away from the corresponding outlet while also permitting disbursement, such as flushing or sweeping, of material.

Figure 8A:
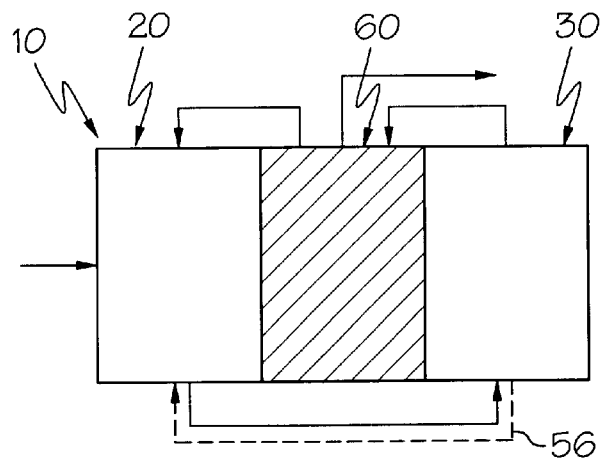
FIG. 8A shows a schematic view of elements of the exemplary apparatus wherein the waste influent material is first introduced to the anoxic zone.

While FIGS. 1 and 2 illustrate an apparatus having one arrangement of three zones, one skilled in the art will recognize that the inventive apparatus may include additional arrangements or zones without departing from the scope of the invention. For example, FIGS. 8A–8E are partial schematic views of several exemplary modular plant arrangements. FIGS. 8A–8E are exemplary in nature and it is contemplated that various other modular plant arrangements could be constructed in accordance with the principles of the present invention. FIG. 8A depicts the general plant arrangement described with reference to FIGS. 1–7 described above. In addition, FIG. 8A illustrates an optional feedback path 56 that can provide communication from the aeration zone 30 to the anoxic zone 20. In one example, the feedback bath 56 is distinct from the anoxic zone outlet 26. This feedback path from the aeration zone to the anoxic zone may enhance the efficiency of the apparatus in accordance with the present invention and can be provided in any of the embodiments of the present invention.

Figure 8B:
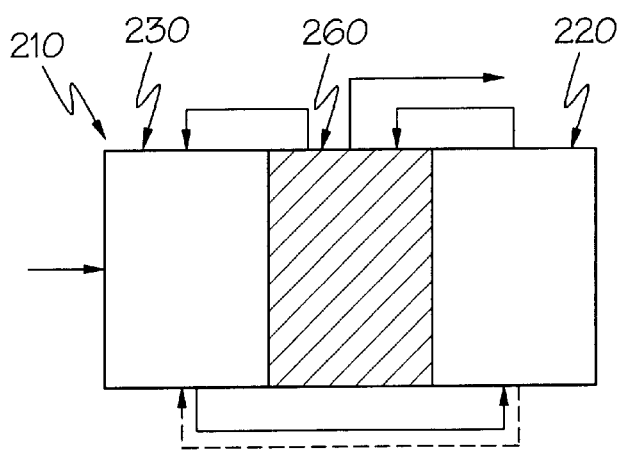
FIG. 8B shows a schematic view of elements of another exemplary apparatus wherein the waste influent material is first introduced to the aeration zone.

FIG. 8B illustrates an apparatus 210 that is similar to the apparatus 10 described with respect FIGS. 1–7 and 8A described above except that the positions of the anoxic zone and aeration zone have been reversed. That is, the influent material can be first introduced to the aeration zone 230. The material is then transferred from the aeration zone 230 to the anoxic zone 220 where a carbon source may be provided to facilitate breakdown of the material. Finally, the material passes through the sedimentation zone 260 prior to exiting the apparatus. Thus, nitrification would initially occur in the first aerobic zone followed by denitrification in the anoxic zone. It is contemplated that all of the embodiments of the present invention can involve reversing the positions of the aeration and anoxic zones such that the influent material is introduced to the aeration zone prior to being introduced to the anoxic zone.

Figure 8C:
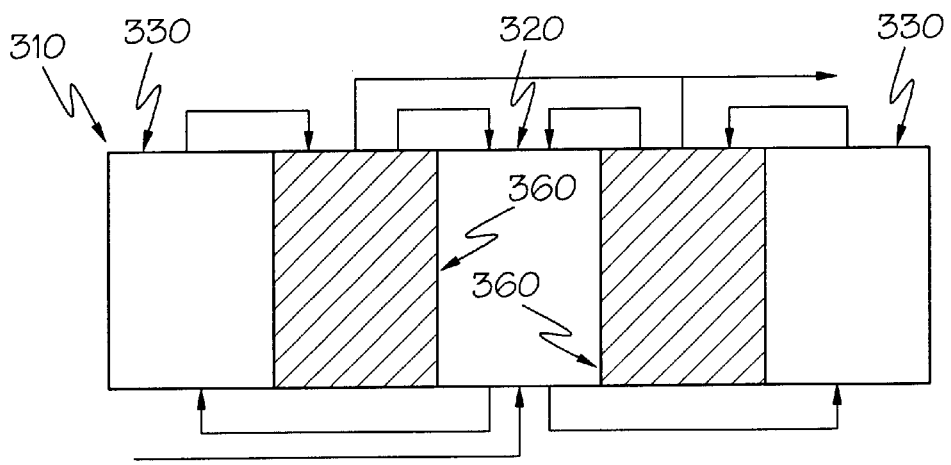
FIG. 8C shows a schematic view of elements of yet another exemplary apparatus including a central anoxic zone, two sedimentation zones and two aeration zones.

FIG. 8C depicts an apparatus 310 wherein an anoxic zone 320 is positioned centrally with sedimentation zones 360 located on each lateral side of the anoxic zone 320. In addition, the outer ends of the apparatus 310 are each provided with a corresponding aeration zone 330. Apparatus 310 are. useful for applications that require purification at a larger waste material influent rate.

Figure 8D:
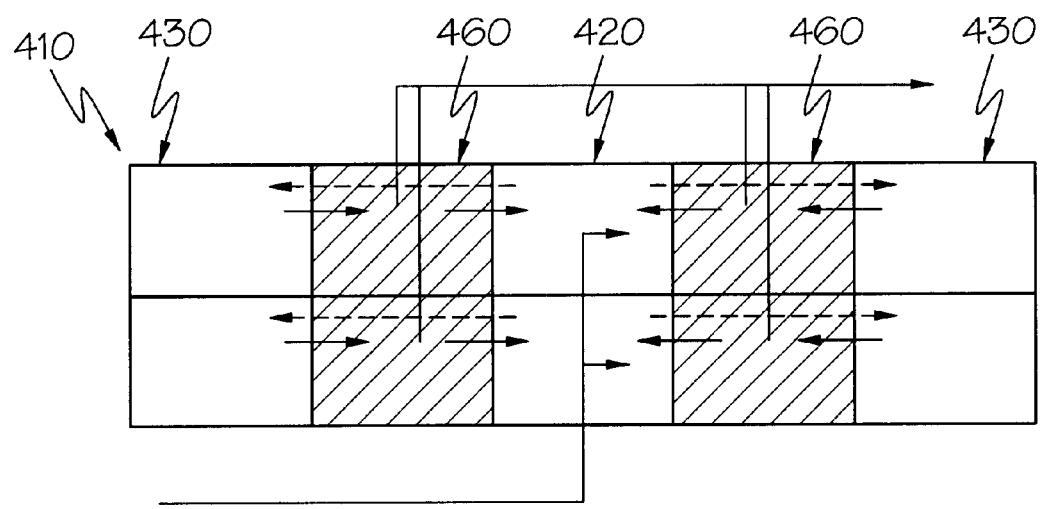
FIG. 8D shows a schematic view of elements of still another exemplary apparatus including two central anoxic zones, four sedimentation zones and four aeration zones.

FIG. 8D illustrates an apparatus 410 similar to the apparatus 310 except that a plurality of like components (e.g., anoxic zone 420, aeration zone 430, and sedimentation zone 460) are offset from one another such that one sub-apparatus (similar to the apparatus 310) is offset and parallel to an identical sub-apparatus. Although two sub-apparatus are illustrated in FIG. 8D, it is contemplated that three or more sub-apparatus may be arranged parallel to one another. Such an arrangement would be desirable to further increase the flow output of the system while minimizing the total length of the apparatus. In addition, two or more apparatus in accordance with any of the embodiments of the present invention may be arranged in series to increase the quality of the purified effluent stream. It is understood that any apparatus described throughout the entire application may be arranged as two or more sub-apparatus in series or parallel in accordance with the principles of the present invention.

Figure 8E:
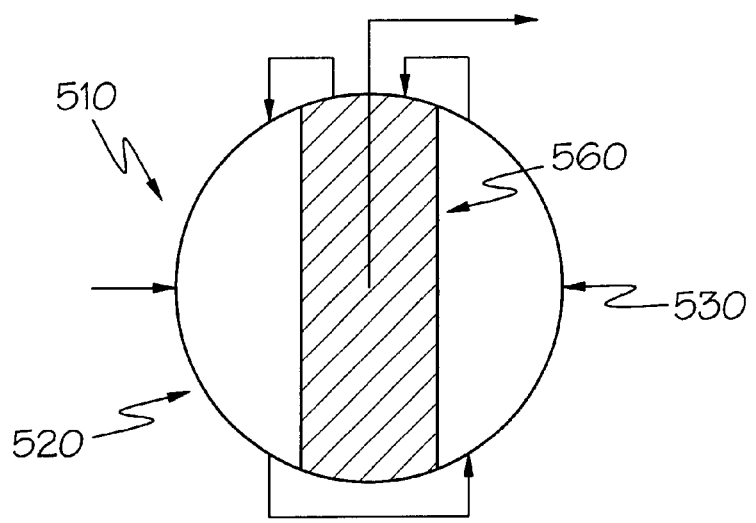
FIG. 8E shows a schematic view of elements of another exemplary apparatus similar to the apparatus of FIG. 8A, except that it has a circular cross-sectional shape.

The apparatus described above are illustrated as being rectangular or substantially square in shape. It is understood that other apparatus shapes may be used depending on the site requirements, availability of materials, etc. For example, as shown in FIG. 8E, an apparatus 510 includes an anoxic zone 520, aeration zone 530 and sedimentation zone 560. The apparatus 510 has a substantially circular cross-sectional profile. Such a profile may be used with smaller designs and/or smaller apparatus when there is limited space to store the apparatus.

Exemplary methods for purifying a waste influent material using the apparatus of FIGS. 1–8A is described. A waste influent material 14 from a source 12 is transferred into the device 110 at a waste influent material flow rate such that the material level in the first area 26 raises to an equilibrium level (e.g., $L_1$, $L_2$, etc). The material then negotiates the obstacle 124 (e.g., by spilling over a spill wall, passing through a flow restrictor, etc.) to enter the second area 128. Material from the second area 128 then passes through the conduit 16 to be introduced to the anoxic zone 20.

Mixers 22 located at the bottom of the anoxic zone 20 mix the material in the anoxic zone to facilitate anoxic processing of the material. As material is added to the anoxic zone 20 through the conduit 16, processed material passes through the outlet 26 formed in the lower partition 28. The material then passes through the conduit 24 and exits at an end 25 into the aeration zone 30.

Once in the aeration zone 30, oxygen is dissolved in the material. For example, one or more blowers 24 may supply the aeration devices 32 with a source of pressurized air that is thereafter mixed into the material in the aeration zone to support aerobic processing of the material. Aerobically processed material then passes through an inlet 18 of the sedimentation zone 60. Once the material enters the sedimentation zone, sludge or other biomass tends to separate from the material and settle in the lower area 75 of the sedimentation zone. When the design MLSS concentration is achieved in the sedimentation zone 60, valve assemblies (e.g., see 80 and 82) may be adjusted such that the sludge material (excess MLSS) is transferred to the sludge zone 84. When the sludge level in the sludge zone 84 rises sufficiently, surface fluid in the sludge zone 84 may flow through overflow conduit 85 to be reintroduced to the anoxic zone 20.

Less dense purified liquid and any foam scum tends to rise to the upper portion of the sedimentation zone 60. Purified liquid then spills over the spill wall 95 and is thereafter received in the trough 94. The fluid then falls through the second outlet 86 and may pass through a conduit 88 to be released from the apparatus and thereafter received by an optional treatment zone 90 prior to release to the surrounding environment. The blocking plate 96 will prevent any scum from spilling over the spill wall 95. One or more skimmers 100 remove floating scum and/or other debris from the sedimentation zone 60 at the material level 11. The scum or other debris can be returned to the anoxic zone 20 or discharged in sludge zone 84.

In order to further purify the material, the sedimentation zone 60 can recycle material from the lower area 75 to the anoxic zone 20. In one example, an air lift pump 77 causes material from the lower area of the sedimentation zone to pass through first outlet 72 for reintroduction to the anoxic zone 20. Air lift control valve 114 controls the recycle flow rate based on the waste influent material flow rate.

The material in the lower area 75 of the sedimentation zone 60 is disbursed to prevent coagulation or clotting of the sludge. The device 150 is positioned relative to the inlet 18 and is adapted to manipulate a material flow profile 180 as material travels into the sedimentation zone 60. Portions 182 of the flow profile 180 on lateral sides of the inlet cause increased flow rates and/or velocity of the profile portions 182. The flow profile 180 assists in disbursing the material at the lower area 75 without directly orienting the flow profile at the first outlet 72. In addition the increased flow rates and/or velocity and direction of profile portions 182, especially in combination with the inwardly directed lateral boundaries 63, assist in sweeping the bottom end portions 61 of the sedimentation zone 60 to prevent dead zones of reduced disbursement that might otherwise result in coagulation and or clotting of sludge in lower area 75 of the sedimentation zone 60.

The methods and apparatus of this invention may be applied in the treatment of a wide variety of industrial, municipal and combined waste streams containing low, medium, or high concentrations of organic matters measured as Biochemical Oxygen Demand (BOD), Chemical Oxygen Demand (COD) along with unoxidized forms of nitrogen, total Kjeldahl Nitrogen, (TKN) organic nitrogen and phosphorous and reducing these contaminates to levels suitable for the most stringent discharge standards for receiving waters. Thus, as described above, embodiments of the present invention provide exemplary apparatus effective wastewater treatment for carbonaceous removal, nitrification and denitrification by employing one or more sedimentation zones and may be constructed to process from 2,000 to 10,000,000 gallons of influent material per day.

It is contemplated that the principles of the present invention may also be applied to existing wastewater treatment apparatus. For example, an existing wastewater treatment apparatus may be retrofitted with the design described above to create the sedimentation zone within the preexisting shell of the treatment apparatus.

The specific embodiments and examples set forth above are provided for illustrative purposes only and are not intended to limit the scope of the following claims. For example, whenever a pump function is needed throughout this application, any hydraulic pump (e.g., airlift pump, etc.) may be used in order to move material from one area to another. Additional embodiments of the invention and advantages provided thereby will be apparent to one of ordinary skill in the art and are within the scope of the claims.

What is claimed is:

1. An apparatus for purifying a waste influent material comprising:
   a) an anoxic zone,
   b) an aeration zone in communication with the anoxic zone,
   c) a sedimentation zone in communication with the aeration and anoxic zones and defined by a plurality of boundaries including a first boundary and a second boundary, wherein the sedimentation zone further comprises an inlet defined by the first boundary to receive material from the aeration zone, a first outlet in a lower portion of the sedimentation zone to recycle material from the sedimentation zone to the anoxic zone and a second outlet in an upper portion of the sedimentation zone adapted to release purified effluent material from the apparatus; and
   d) a device positioned relative to the inlet and adapted to manipulate a material flow profile as material travels into the sedimentation zone.

2. The apparatus of claims 1, wherein the sedimentation zone has a substantially V-shaped cross sectional profile.

3. The apparatus of claim 1, wherein the inlet is located in the lower portion of the sedimentation zone.

4. The apparatus of claims 1, wherein the device is adapted to redirect the flow profile away from the first outlet.

5. The apparatus of claim 1, wherein the device is adjustable relative to the inlet to change the material flow profile.

6. The apparatus of claim 5, wherein the device permits material flow through the inlet at any adjusted position of the device with respect to the inlet.

7. The apparatus of claim 1, wherein the device is adjacent the first boundary and the first outlet is opposed from the device and adjacent the second boundary.

8. The apparatus of claim 7, wherein the device is adjacent a center portion of the first boundary and the first outlet is adjacent a center portion of the second boundary.

9. The apparatus of claim 1, wherein the first boundary is positioned between the aeration zone and the sedimentation zone and wherein the second boundary is positioned between the anoxic zone and the sedimentation zone.

10. The apparatus of claim 11, wherein at least sections of the first and second boundaries are located at an angle with respect to one another to define a substantially V-shaped sedimentation zone.

11. The apparatus of claim 10, wherein the angle is from approximately 30° to approximately 70°.

12. The apparatus of claim 11, wherein the angle is from approximately 30° to approximately 60°.

13. The apparatus of claim 10, wherein a lower portion of the V-shaped sedimentation zone is truncated.

14. The apparatus of claim 1, wherein acute angles between a horizontal axis and portions of each of the first and second boundaries are from approximately 55° to approximately 75° to define a substantially V-shaped sedimentation zone.

15. The apparatus of claim 14, wherein the acute angles are from approximately 60° to approximately 75°.

16. The apparatus of claim 1, wherein the inlet is defined by first and second portions of the first boundary.

17. The apparatus of claim 16, wherein the second boundary and the second portion of the first boundary are connected to one another at a lowermost portion of the sedimentation zone.

18. The apparatus of claim 16, wherein the inlet is defined by a spacing between the first and second portions of the first boundary.

19. The apparatus of claim 18, wherein the spacing is achieved by an offset of the first portion from the second portion.

20. The apparatus of claim 19, wherein the first and second portions are parallel with respect to one another.

21. The apparatus of claims 19, wherein the first portion of the first boundary is offset from an interior surface of the second portion of the first boundary.

22. The apparatus of claim 19, wherein the first and second portions of the first boundary overlap to define an overlapped area therebetween.

23. The apparatus of claim 22, wherein the device is adjustable to at least partially enter the overlapped area.

24. The apparatus of claim 22, wherein the device has a substantially planar outer surface facing away from the first portion of the first boundary.

25. The apparatus of claim 22, wherein the device has a substantially concave outer surface facing away from the first portion of the first boundary.

26. The apparatus of claim 22, wherein the device has a substantially convex outer surface facing away from the first portion of the first boundary.

27. The apparatus of claim 1, wherein the first outlet is further adapted to transfer waste material from the sedimentation zone to a waste holding tank.

28. The apparatus of claim 1, wherein the sedimentation zone comprises a first sedimentation zone and a second sedimentation zone.

29. The apparatus of claim 28, wherein the anoxic zone is positioned between the first and second sedimentation zones.

30. The apparatus of claim 1, wherein the aeration zone comprises a first aeration zone and a second aeration zone.

31. The apparatus of claim 1, wherein the anoxic zone comprises a first anoxic zone and a second anoxic zone.

32. The apparatus of claim 1, wherein a path is provided to recycle material from the aeration zone to the anoxic zone.

33. The apparatus of claim 32, further comprising an outlet to permit material transfer from the anoxic zone to the aeration zone, and further comprising a feedback path that is distinct from the aiioxic zone outlet and is adapted to recycle material from the aeration zone to the anoxic zone.

34. The apparatus of claim 1, wherein the inlet is located in the lower half of the sedimentation zone.

35. The apparatus of claims 1, further comprising a device adapted to facilitate control of a recycle material flow rate from the sedimentation zone to the anoxic zone based on a waste influent material flow rate.

36. The apparatus of claim 1, wherein the first boundary includes a first portion and a second portion extending at an angle with respect to the second boundary, wherein the first portion of the first boundary is offset from and overlaps an interior surface of the second portion of the first boundary to define an overlapped area therebetween, and wherein the inlet comprises the overlapped area.

37. The apparatus of claim 36, wherein the device at least partially enters the overlapped area.

38. The apparatus of claim 28, wherein the aeration zone comprises a first aeration zone and a second aeration zone that is not in direct communication with the first aeration zone, the first aeration zone being in direct communication with the first sedimentation zone and the second aeration zone being in direct communication with the second sedimentation zone.

39. An apparatus for purifying a waste influent material comprising:

a) an anoxic zone,
b) an aeration zone in communication with the anoxic zone, and
c) a sedimentation zone in communication with the aeration and anoxic zones and defined by a plurality of boundaries including a first boundary and a second boundary arranged such that the sedimentation zone has a substantially V-shaped cross sectional profile, wherein the sedimentation zone further comprises an inlet defined by the first boundary at a lower portion of the V-shaped cross sectional profile to directly receive material from the anoxic zone without first passing through the aeration zone, a first outlet in the lower portion of the sedimentation zone to recycle material from the sedimentation zone to the aeration zone and a second outlet in an upper portion of the sedimentation zone adapted to release purified effluent material from the apparatus.

40. A sedimentation zone for purifying a waste influent material comprising:
   a) a first boundary including a first portion with an outer end and a second portion with an outer end, wherein the first portion is offset from an interior surface of the second portion to define an overlapped area therebetween from the outer end of the first portion to the outer end of the second portion, the outer end of the second portion is located in a lower portion of the sedimentation zone, wherein the first and second portions of the first boundary define an inlet located in the lower portion of the sedimentation zone and comprising the overlapped area,
   b) a second boundary, wherein at least sections of the first and second boundaries are located at an angle with respect to one another to define a substantially V-shaped sedimentation zone, and
   c) an outlet in a lower portion of the sedimentation zone.

41. The apparatus of claim 40, wherein the outer end of the second portion is located in a lower half of the sedimentation zone.

42. The apparatus of claim 40, further comprising a device positioned relative to the inlet and adapted to manipulate a material flow profile as material travels into the sedimentation zone.

43. The apparatus of claim 42, wherein the device is adapted to redirect the flow profile away from the outlet.

44. The apparatus of claim 42, wherein the device is adjustable relative to the inlet to change the material flow profile.

45. The apparatus of claim 44, wherein the device is adjustable to at least partially enter the overlapped area.

46. The apparatus of claim 44, wherein the device has a substantially planar outer surface facing away from the first portion of the first boundary.

47. The apparatus of claim 44, wherein the device has a substantially concave outer surface facing away from the first portion of the first boundary.

48. The apparatus of claim 44, wherein the device has a substantially convex outer surface facing away from the first portion of the first boundary.

49. The apparatus of claim 44, wherein the device permits material flow through the inlet at any adjusted, position of the device with respect to the inlet.

50. The apparatus of claim 42, wherein the device is adjacent the first boundary and the outlet is opposed from the device and adjacent the second boundary.

51. The apparatus of claim 50, wherein the device is adjacent a center portion of the first boundary and the outlet is adjacent a center portion of the second boundary.

52. The apparatus of claim 40, wherein the angle is from approximately 30° to approximately 70°.

53. The apparatus of claim 52, wherein the angle is from approximately 30° to approximately 60°.

54. The apparatus of claim 40, wherein a lower portion of the V-shaped sedimentation zone is truncated.

55. The apparatus of claim 40, wherein acute angles between a horizontal axis and portions of each of the first and second boundaries are from approximately 55° to approximately 75° to define the substantially V-shaped sedimentation zone.

56. The apparatus of claim 55, wherein the acute angles are from approximately 60° to approximately 75°.

57. The apparatus of claim 40, wherein the second boundary and the second portion of the first boundary are connected to one another at a lowermost portion of the sedimentation zone.

58. The apparatus of claim 40, wherein the first and second portions are parallel with respect to one another.

59. An apparatus for purifying a waste influent material comprising:
   a) an anoxic zone,
   b) an aeration zone in communication with the anoxic zone,
   c) a sedimentation zone in communication with the aeration and anoxic zones and defined by a plurality of boundaries including a first boundary and a second boundary, wherein the sedimentation zone further comprises an inlet defined by the first boundary to receive material from the aeration zone, a first outlet in a lower portion of the sedimentation zone to recycle material from the sedimentation zone to the anoxic zone and a second outlet in an upper portion of the sedimentation zone adapted to release purified effluent material from the apparatus; and
   d) a device adapted to facilitate control of a recycle material flow rate from the sedimentation zone to the anoxic zone based on a waste influent material flow rate.

60. The apparatus of claim 59, wherein the device comprises:
   a) a container,
   b) a sensing device positioned with respect to the container and adapted to sense the fluid level in the container, and
   c) a control valve assembly in communication with the sensing device, wherein the control valve assembly comprises a control valve adapted for adjustment to a predetermined setting based on the fluid level in the container.

61. The device of claim 60, wherein the container is provided with an obstacle to restrict material from exiting the container.

62. The device of claim 61, wherein the obstacle partitions the container into a first area and a second area, and wherein the obstacle is adapted to cause an equilibrium level to be achieved in the first area at a constant material flow rate through the container.

63. The device of claim 60, wherein the sensing device comprises a pressure tube having an open lower end positioned in the container and a closed upper end.

64. The device of claim 60, wherein the sensing device is adapted to transmit a pressure signal to the control valve assembly based on the level of fluid in the container.

65. The device of claim 64, wherein the control valve assembly further comprises an actuator adapted to receive the pressure signal to actuate the control valve.

66. An apparatus for purifying a waste influent material comprising:
   a) an anoxic zone,
   b) an aeration zone in communication with the anoxic zone, and
   c) a sedimentation zone in communication with the aeration and anoxic zones and defined by a plurality of boundaries including a first boundary and a second boundary, the first boundary being positioned between the aeration zone and the sedimentation zone and the second boundary being positioned between the anoxic zone and the sedimentation zone such that the sedimentation zone is located between the anoxic zone and the aeration zone, wherein the sedimentation zone further comprises an inlet defined by the first boundary to receive material from the aeration zone, a first outlet in a lower portion of the sedimentation zone to recycle material from the sedimentation zone to the anoxic zone and a second outlet in an upper portion of the sedimentation zone adapted to release purified effluent material from the apparatus.

67. A method for purifying a waste influent material comprising the steps of:
   a) introducing a waste influent material to an anoxic zone,
   b) transferring material from the anoxic zone to an aeration zone,
   c) transferring material through an inlet from the aeration zone to a sedimentation zone defined by a plurality of boundaries including a first boundary and a second boundary, wherein the inlet is defined by the first boundary and provided at the lower portion of the sedimentation zone, wherein a device is provided and positioned relative to the inlet, wherein the device manipulates a material flow profile as material is transmitted from the aeration zone to the sedimentation zone, and wherein the sedimentation zone is provided with a first outlet in a lower portion of the sedimentation zone and a outlet in an upper portion of the sedimentation zone.
   d) transferring material through the first outlet to recycle material from the sedimentation zone to the anoxic zone, and
   e) releasing purified material from the sedimentation zone through the second outlet.

68. The method of claim 67, further comprising the step of redirecting the flow profile away from the first outlet with the device.

69. The method of claim 67, further comprising the step of adjusting the device relative to the inlet to change the material flow profile.

70. The method of claim 69, further comprising the step of adjusting the device such that the device at least partially enters an overlapped area of the inlet.

71. The method of claim 67, wherein the device is positioned adjacent a center portion of the first boundary and the first outlet is positioned at a location opposed from the device and adjacent a center portion of the second boundary.

72. The method of claim 67, further comprising the step of transferring material through the first outlet to a sludge holding tank.

73. The method of claim 67, further comprising the step of transferring material from the aeration zone to the anoxic zone.

74. The method of claim 67, further comprising the step of controlling the rate of material through the first outlet based on the rate at which the waste influent material is introduced to the anoxic zone.

* * * * *

UNITED STATES PATENT AND TRADEMARK OFFICE
CERTIFICATE OF CORRECTION

PATENT NO.    : 6,620,322 B1                                          Page 1 of 1
DATED         : September 16, 2003
INVENTOR(S)   : Michael G. Vesio It is certified that error appears in the above-identified patent and that said Letters Patent is hereby corrected as shown below:

Column 15,
Lines 20 and 24, change "claims 1" to -- claim 1 --.
Line 42, change "claim 11" to -- claim 1 --.

Column 16,
Line 6, change "claims 19" to -- claim 19 --.
Line 42, change "aiioxic" to -- anoxic --.
Line 46, change "claims 1" to -- claim 1 --.

Column 17,
Line 60, change "adjusted, position" to -- adjusted position --.

Column 20,
Line 4, change "a outlet" to -- a second outlet --.

Signed and Sealed this

Twenty-fifth Day of November, 2003

JAMES E. ROGAN
*Director of the United States Patent and Trademark Office*